(12) United States Patent
Yamamoto

(10) Patent No.: US 9,446,783 B2
(45) Date of Patent: Sep. 20, 2016

(54) STEERING APPARATUS

(71) Applicant: NSK LTD., Tokyo (JP)

(72) Inventor: Ko Yamamoto, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/911,355

(22) PCT Filed: Dec. 19, 2014

(86) PCT No.: PCT/JP2014/083740
§ 371 (c)(1),
(2) Date: Feb. 10, 2016

(87) PCT Pub. No.: WO2015/114991
PCT Pub. Date: Aug. 6, 2015

(65) Prior Publication Data
US 2016/0200345 A1    Jul. 14, 2016

(30) Foreign Application Priority Data

Jan. 30, 2014  (JP) .................................. 2014-015889
Nov. 13, 2014  (JP) .................................. 2014-230318

(51) Int. Cl.
B62D 1/18   (2006.01)
B62D 1/185  (2006.01)

(52) U.S. Cl.
CPC .................................... B62D 1/185 (2013.01)

(58) Field of Classification Search
CPC ............ B62D 1/14; B62D 1/16; B62D 1/18; B62D 1/185; B62D 1/187
USPC .................................... 280/775; 74/492, 493
See application file for complete search history.

(56) References Cited

U.S. PATENT DOCUMENTS 5,961,146 A * 10/1999 Matsumoto ............. F16F 7/123
                                                    280/775
6,139,057 A * 10/2000 Olgren .................... B62D 1/184
                                                    280/775

(Continued)

FOREIGN PATENT DOCUMENTS

JP    2007-45276 A    2/2007
JP    2008-132819 A   6/2008

(Continued)

OTHER PUBLICATIONS

International Search Report for PCT/JP2014/083740 dated Mar. 17, 2015.

Primary Examiner — Toan To
(74) Attorney, Agent, or Firm — Sughrue Mion, PLLC

(57) ABSTRACT

A steering apparatus includes a steering column including a cylindrical outer column and a cylindrical inner column partially inserted into the outer column, and rotatably supporting an input shaft connected to a steering wheel, two telescopic adjustment portions projecting from an outer peripheral surface of the outer column to extend facing each other, the two telescopic adjustment portions each including an elongated hole elongated in an axial direction of the outer column, a rod penetrating the elongated hole, and an urging member provided on an outer peripheral surface of the inner column exposed from a slit provided between the two telescopic adjustment portions on the outer peripheral surface of the outer column, and urging the rod outward in a radial direction of the inner column and being positioned in an opening portion provided in an outer peripheral surface of the inner column.

5 Claims, 9 Drawing Sheets

(56) References Cited

U.S. PATENT DOCUMENTS

| | | | | |
|---|---|---|---|---|
| 2008/0191457 A1* | 8/2008 | Ridgway | B62D 1/184 | 280/775 |
| 2008/0231031 A1* | 9/2008 | Manwaring | B62D 1/184 | 280/775 |
| 2009/0107283 A1 | 4/2009 | Uesaka | | |
| 2011/0175335 A1* | 7/2011 | Takezawa | B62D 1/185 | 280/775 |
| 2011/0203403 A1* | 8/2011 | Maniwa | B62D 1/189 | 74/493 |
| 2011/0204610 A1 | 8/2011 | Kwon | | |
| 2012/0247258 A1* | 10/2012 | Maniwa | B62D 1/184 | 74/493 |
| 2013/0042716 A1* | 2/2013 | Davies | B62D 1/195 | 74/493 |
| 2014/0069223 A1* | 3/2014 | Bang | B62D 1/184 | 74/493 |
| 2014/0144277 A1* | 5/2014 | Kakishita | B62D 1/187 | 74/493 |
| 2016/0107675 A1* | 4/2016 | Yamada | B62D 1/184 | 74/493 |

FOREIGN PATENT DOCUMENTS

| | | |
|---|---|---|
| JP | 2008-265419 A | 11/2008 |
| JP | 2010-30579 A | 2/2010 |
| JP | 2013-43509 A | 3/2013 |
| JP | 2014-4889 A | 1/2014 |

* cited by examiner

STEERING APPARATUS

CROSS REFERENCE TO RELATED APPLICATIONS

This application is a National Stage of International Application No. PCT/JP2014/083740 filed Dec. 19, 2014, claiming priority based on Japanese Patent Application Nos. 2014-015889 filed Jan. 30, 2014 and 2014-230318 filed Nov. 13, 2014, the contents of all of which are incorporated herein by reference in their entirety.

BACKGROUND OF THE INVENTION

1. Field of the invention

The present invention relates to a steering apparatus.

2. Description of the Related Art

Tilt mechanisms and telescopic mechanisms are widely known which are each included in a steering apparatus that steers wheels to a steering angle in accordance with a rotation of a steering wheel. For example, Prior Art 1 discloses a steering apparatus for vehicle having a tightening rod inserted through a tilt-elongated hole in a vehicle body bracket and a telescopic-elongated hole in a column bracket. The steering apparatus for vehicle of Prior Art 1 releases a force tightening the vehicle body bracket by turning of an operation lever, and performs tilt adjustment and telescopic adjustment.

PRIOR ART

Prior Art 1: Japanese Patent Application Laid-open No. 2008-265419

SUMMARY

Technical Problem

In such a steering apparatus as disclosed in Prior Art 1, a gap is generated between the tightening rod and an inner wall of the telescopic-elongated hole so that the tightening rod can be slid relative to the telescopic-elongated hole upon telescopic adjustment. Therefore, upon telescopic adjustment, play caused by the gap might be generated during operation of the steering column. Thus, there has been a possibility that the telescopic adjustment is not smoothly performed.

The present invention has been made in view of the above problem, and an object of the present invention is to provide a steering apparatus which can inhibit play of a steering column caused by a gap between a rod and an inner wall of an elongated hole, and smoothly perform telescopic adjustment.

SUMMARY OF THE INVENTION

According to an aspect of the invention, a steering device includes: a steering column including a cylindrical outer column and a cylindrical inner column partially inserted into the outer column, and rotatably supporting an input shaft connected to a steering wheel; two telescopic adjustment portions projecting from an outer peripheral surface of the outer column to extend facing each other, the two telescopic adjustment portions each including an elongated hole elongated in an axial direction of the outer column; a rod penetrating the elongated hole; and an urging member provided on an outer peripheral surface of the inner column exposed from a slit provided between the two telescopic adjustment portions on the outer peripheral surface of the outer column, and urging the rod outward in a radial direction of the inner column.

Therefore, in the steering apparatus according to the present invention, the rod is moved outward in a radial direction of an inner column compared with the rod being not urged. Therefore, the rod is biased toward one side of elongated holes in a transverse direction, and the rod is readily held in a state making contact with inner walls of the elongated holes. Accordingly, the steering apparatus according to the present invention can inhibit play of a steering column caused by a gap between the rod and each of the inner walls of the elongated holes, and smoothly perform telescopic adjustment.

According to further aspect of the invention, the inner column includes an opening portion in an outer peripheral surface, the urging member includes a spring portion, a fitting portion projecting relative to the spring portion to extend inward in a radial direction of the outer column, and is fitted into the opening portion, and a contact portion projecting from the spring portion to extend in the axial direction of the outer column and making contact with the rod, and the spring portion of the urging member has two leg portions, the two leg portions urge the rod outward in the radial direction of the outer column. Therefore, while an urging member is positioned by a fitting portion, the rod can be urged outward in the radial direction of an outer column by a contact portion. The position of the urging member is fixed in normal use, and the rod can be further stably urged.

According to further aspect of the invention, the inner column includes an opening portion in an outer peripheral surface, the urging member includes a spring portion, a fitting portion projecting relative to the spring portion to extend inward in a radial direction of the outer column, and is fitted into the opening portion, a contact portion projecting from the spring portion to extend in the axial direction of the outer column and making contact with the rod, and a ring portion, the fitting portion is provided with a stopper portion making contact with a rear side inner wall of the opening portion of the inner column, and the ring portion urges the rod forward in the axial direction of the outer column. Therefore, while the urging member is positioned by the fitting portion, the rod can be urged forward in an axial direction of the outer column by the contact portion. The position of the urging member is fixed in normal use, and the rod can be further stably urged.

According to still further aspect of the invention, the inner column includes an opening portion in an outer peripheral surface, the urging member includes a base portion, a fitting portion projecting from the base portion to extend inward in the radial direction of the outer column, and fitted into the opening portion, and a deformable portion projecting from the base portion to extend in the axial direction of the outer column, held between the rod and the inner column, and elastically deformed. Therefore, while the urging member is positioned by the fitting portion, the rod can be urged by the deformable portion. The position of the urging member is fixed in normal use, and the rod can be further stably urged.

According to still further aspect of the invention, the urging member is positioned at a position having an equal distance from the two telescopic adjustment portions. In a case where the urging member is disposed biased toward one of two telescopic adjustment portions, a portion of the rod penetrating a farther one of the elongated holes from the urging member is unlikely to be restricted in movement in a transverse direction of the elongated hole. Therefore, the rod might be tilted in the transverse direction of the elongated hole, with a closer one of the elongated holes to the urging member as a fulcrum. Therefore, play amplified according to a distance from the other one of the elongated holes closer to the urging member might be generated at an end of an operation lever. In contrast, in the above-mentioned steering apparatus, the urging member urges the rod at a central position between one of the elongated holes and the other one of the elongated holes, and an urging force generated upon the urging can urge the rod against the inner walls of these two elongated holes in a balanced manner. Thus, the steering apparatus can perform more smooth telescopic adjustment, and great play can be restricted at the end of the operation lever.

According to the present invention, the steering apparatus can be provided which can inhibit play of the steering column caused by the gap between the rod and the inner wall of the elongated hole, and smoothly perform telescopic adjustment.

DETAILED DESCRIPTION OF THE PREFERRED EMBODIMENT

A mode (embodiment) for carrying out the present invention will be described in detail with reference to the drawings. The present invention is not limited to the contents of the following embodiment. Further, component elements described below include component elements easily conceived by those skilled in the art or substantially identical. Further, the component elements described below may be suitably combined.

(Embodiment)

Figure 1:
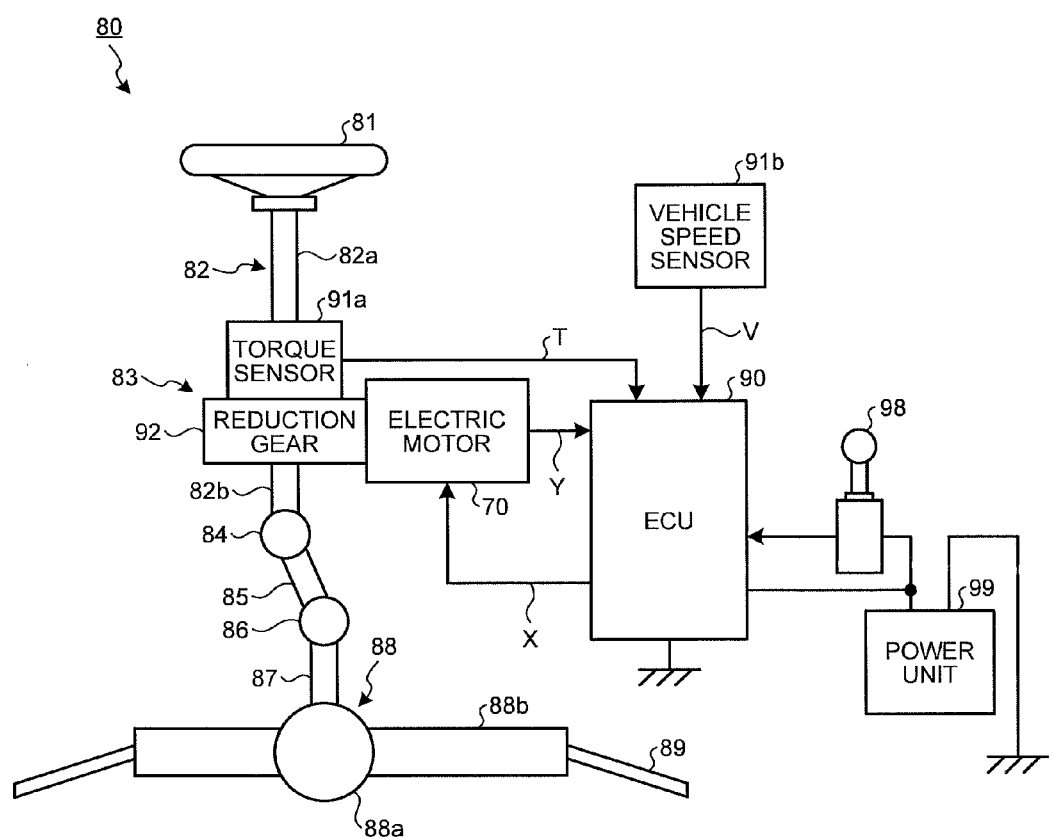
FIG. 1 is a constitution diagram of a steering apparatus according to the present embodiment.
Figure 2:
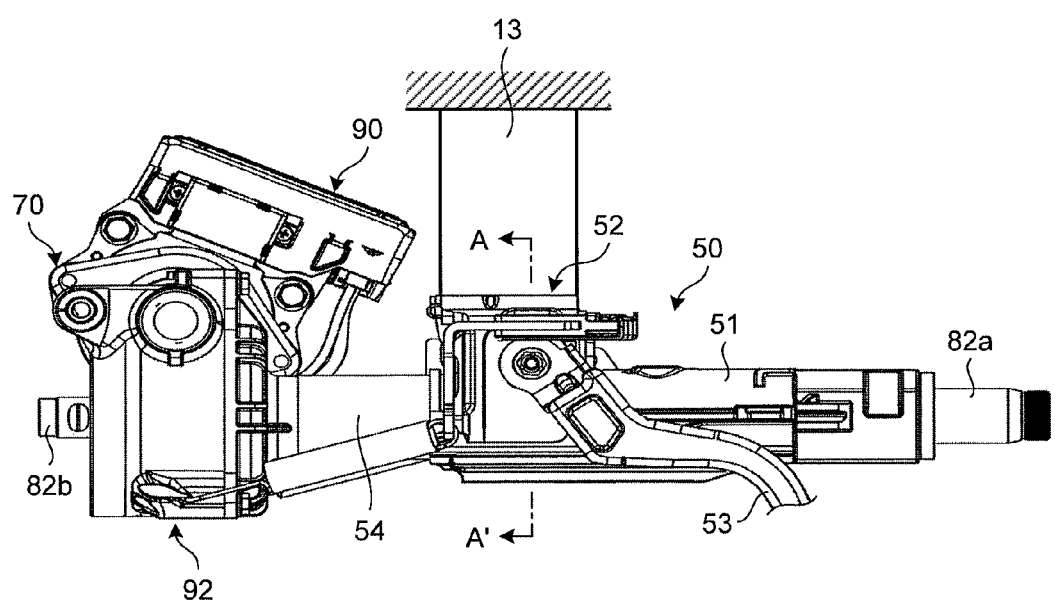
FIG. 2 is a schematic side view of a periphery of a steering column.
Figure 3:
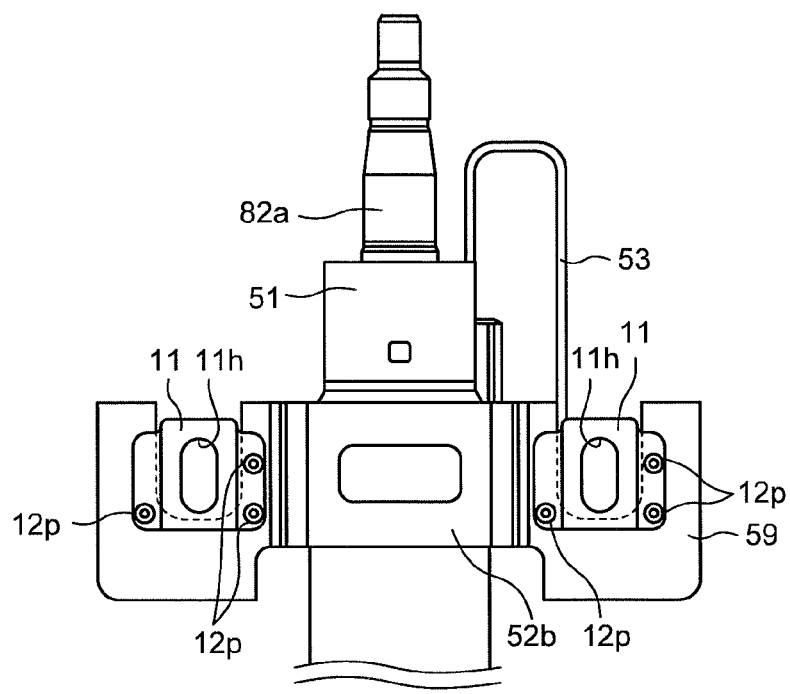
FIG. 3 is a schematic plan view of a part of a steering column which is mounted to a vehicle.
Figure 4:
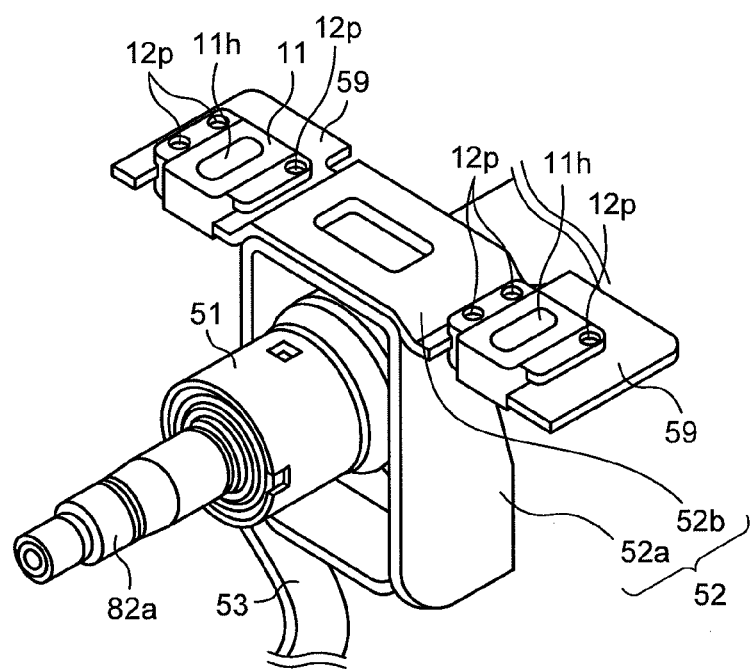
FIG. 4 is a schematic perspective view of a part of a steering column which is mounted to a vehicle.

FIG. 1 is a constitution diagram of a steering apparatus according to the present embodiment. FIG. 2 is a schematic side view of a periphery of a steering column. FIG. 3 is a schematic plan view of a part of the steering column which is mounted to a vehicle. FIG. 4 is a schematic perspective view of the part of the steering column which is mounted to the vehicle. A summary of a steering apparatus 80 according to the present embodiment will be described based on FIGS. 1 to 4. Further, in the following description, when the steering apparatus 80 is mounted to the vehicle, a front side of the vehicle is merely described as a front side, and when the steering apparatus 80 is mounted to the vehicle, a rear side of the vehicle is merely described as a rear side. The front side is on the left side and the rear side is on the right side in FIG. 2.

(Steering Apparatus)

The steering apparatus 80 includes a steering wheel 81, a steering shaft 82, a steering force assist mechanism 83, a universal joint 84, a lower shaft 85, a universal joint 86, a pinion shaft 87, a steering gear 88, and a tie rod 89, in an order of transmission of a force applied by an operator. The steering apparatus 80 further includes an electronic control unit (ECU) 90 and a torque sensor 91a. A vehicle speed sensor 91b is included in the vehicle, and inputs a vehicle speed signal V to the ECU 90 via controller area network (CAN) communication.

The steering shaft 82 includes an input shaft 82a and an output shaft 82b. The input shaft 82a has one end connected to the steering wheel 81, and the other end connected to the steering force assist mechanism 83 through the torque sensor 91a. The output shaft 82b has one end connected to the steering force assist mechanism 83, and the other end connected to the universal joint 84. In the present embodiment, the input shaft 82a and the output shaft 82b are made of, for example, a general steel material, such as carbon steel for machine structural use (SC material) or a cold-rolled steel sheet (SPCC material).

The lower shaft 85 has one end connected to the universal joint 84, and the other end connected to the universal joint 86. The pinion shaft 87 has one end connected to the universal joint 86, and the other end connected to the steering gear 88.

The steering gear 88 includes a pinion 88a and a rack 88b. The pinion 88a is connected to the pinion shaft 87. The rack 88b meshes with the pinion 88a. The steering gear 88 is constituted as a rack and pinion type. The steering gear 88 converts a rotational motion transmitted to the pinion 88a to a linear motion with the rack 88b. The tie rod 89 is connected to the rack 88b, presses and draws a tire not illustrated through this linear motion, and steers steered wheels.

The steering force assist mechanism 83 includes a reduction gear 92 and an electric motor (motor) 70. Note that the electric motor 70 will be described as an example of a so-called brushless motor, but an electric motor may be employed including a brush (slider) and a commutator (rectifier). The reduction gear 92 is connected to the output shaft 82b. The electric motor 70 is an electric motor connected to the reduction gear 92, and generating auxiliary steering torque. Note that, in the steering apparatus 80, the steering column includes the steering shaft 82, the torque sensor 91a, and the reduction gear 92. The electric motor 70 applies the auxiliary steering torque to the output shaft 82b of the steering column. That is, the steering apparatus 80 according to the present embodiment is a column assist type.

As illustrated in FIG. 2, the steering apparatus 80 has a steering column 50 rotatably supporting the input shaft 82a. The steering column 50 has a cylindrical outer column 51, and a cylindrical inner column 54 partially inserted into the outer column 51. The outer column 51 and the inner column 54 are made of, for example, a general steel material, such as a carbon steel tube for machine structural purpose (STKM material) or a die-cast aluminum alloy (ADC material). For example, the outer column 51 is disposed on the rear side of the inner column 54. Note that the outer column 51 may be disposed on the front side of the inner column 54.

The steering apparatus 80 includes a column bracket 52 fixed to a vehicle body member and supporting the steering column 50. The column bracket 52 is made of, for example, a general steel material such as a cold-rolled steel sheet (SPCC material). The column bracket 52 includes a mounting plate portion 52b fixed to the vehicle body member, and side plate portions 52a integrally formed with the mounting plate portion 52b. The side plate portions 52a of the column bracket 52 are disposed facing each other on both sides of the outer column 51, and tighten the outer column 51.

As illustrated in FIGS. 3 and 4, the mounting plate portion 52b of the column bracket 52 has a pair of right and left removable capsules 11 mounted to a vehicle body member 13, and capsule supporting portions 59 mounted to the removable capsules 11 with resin members 12p formed by resin injection. The removable capsules 11 are formed by die-cast molding of aluminum. Each of the removable capsule 11 has a capsule mounting hole 11h, and is fixed to the vehicle body member 13 with a bolt or the like inserted into the capsule mounting hole 11h. Upon secondary collision, a force moving the steering column 50 forward is applied, which makes each of the capsule supporting portions 59 slide toward the front side of the vehicle body relative to the removable capsules 11, and the resin members 12p are sheared. Therefore, support by the removable capsules 11 is released, and the steering column 50 can be separated from the vehicle body.

The torque sensor 91a illustrated in FIG. 1 detects, as steering torque, a steering force applied by a driver and transmitted to the input shaft 82a through the steering wheel 81. The vehicle speed sensor 91b detects a traveling speed of the vehicle (vehicle speed), to which the steering apparatus 80 is mounted. The ECU 90 is electrically connected to the electric motor 70, the torque sensor 91a, and the vehicle speed sensor 91b.

(Control Unit: ECU)

The ECU 90 controls operation of the electric motor 70. The ECU 90 obtains signals from the torque sensor 91a and the vehicle speed sensor 91b, respectively. That is, the ECU 90 obtains the steering torque T from the torque sensor 91a, and acquires the vehicle speed signal V of the vehicle from the vehicle speed sensor 91b. While an ignition switch 98 is turned on, power is supplied to the ECU 90 from the power unit (e.g., vehicle battery) 99. The ECU 90 calculates an auxiliary steering command value of an assist command based on the steering torque T and the vehicle speed signal V. Then, the ECU 90 adjusts a power value X to be supplied to the electric motor 70, based on the calculated auxiliary steering command value. The ECU 90 obtains, as operation information Y, induced voltage information or below-mentioned rotation information of a rotor of a resolver or the like, from the electric motor 70.

The steering force input to the steering wheel 81 by the operator (driver) is transmitted to the reduction gear 92 of the steering force assist mechanism 83 through the input shaft 82a. At this time, the ECU 90 obtains the steering torque T input to the input shaft 82a, from the torque sensor 91a, and obtains the vehicle speed signal V from the vehicle speed sensor 91b. The ECU 90 controls the operation of the electric motor 70. The auxiliary steering torque generated by the electric motor 70 is transmitted to the reduction gear 92.

The steering torque (including the auxiliary steering torque) output through the output shaft 82b is transmitted to the lower shaft 85 through the universal joint 84, and further transmitted to the pinion shaft 87 through the universal joint 86. The steering torque transmitted to the pinion shaft 87 is transmitted to the tie rod 89 through the steering gear 88, and steers the steered wheel.

Figure 5:
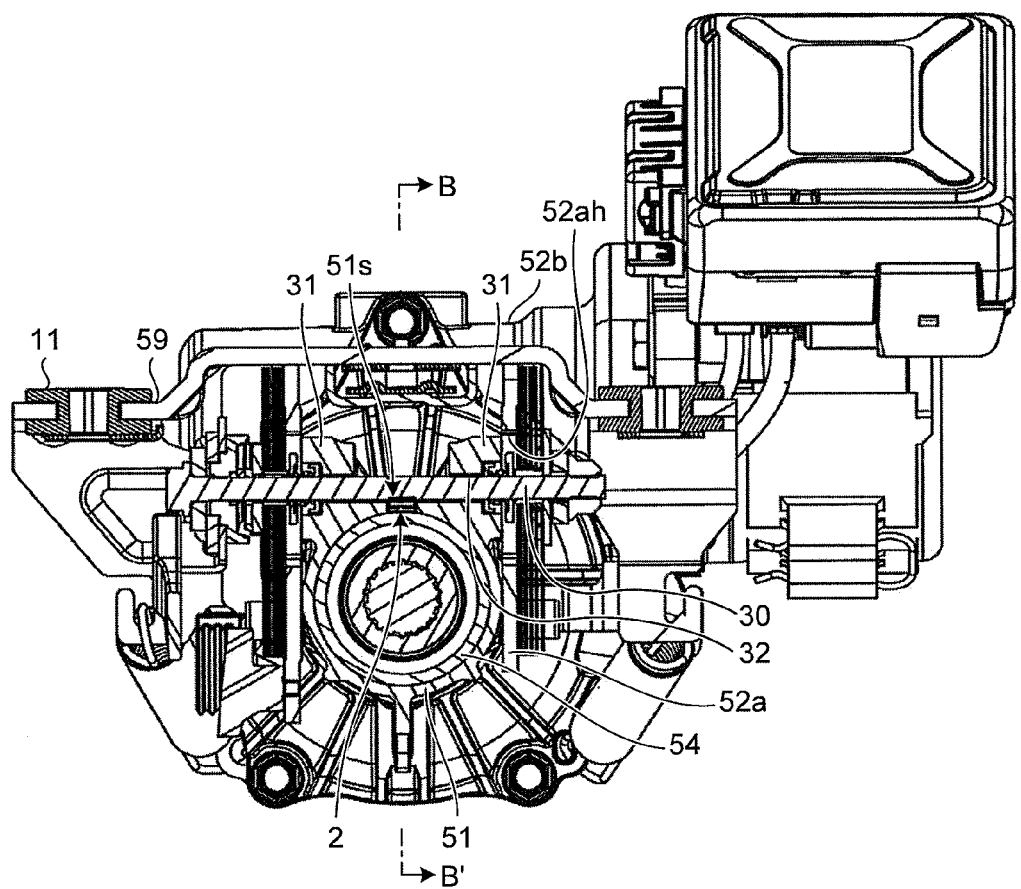
FIG. 5 is a cross-sectional view taken along line A-A' of FIG. 2.
Figure 6:
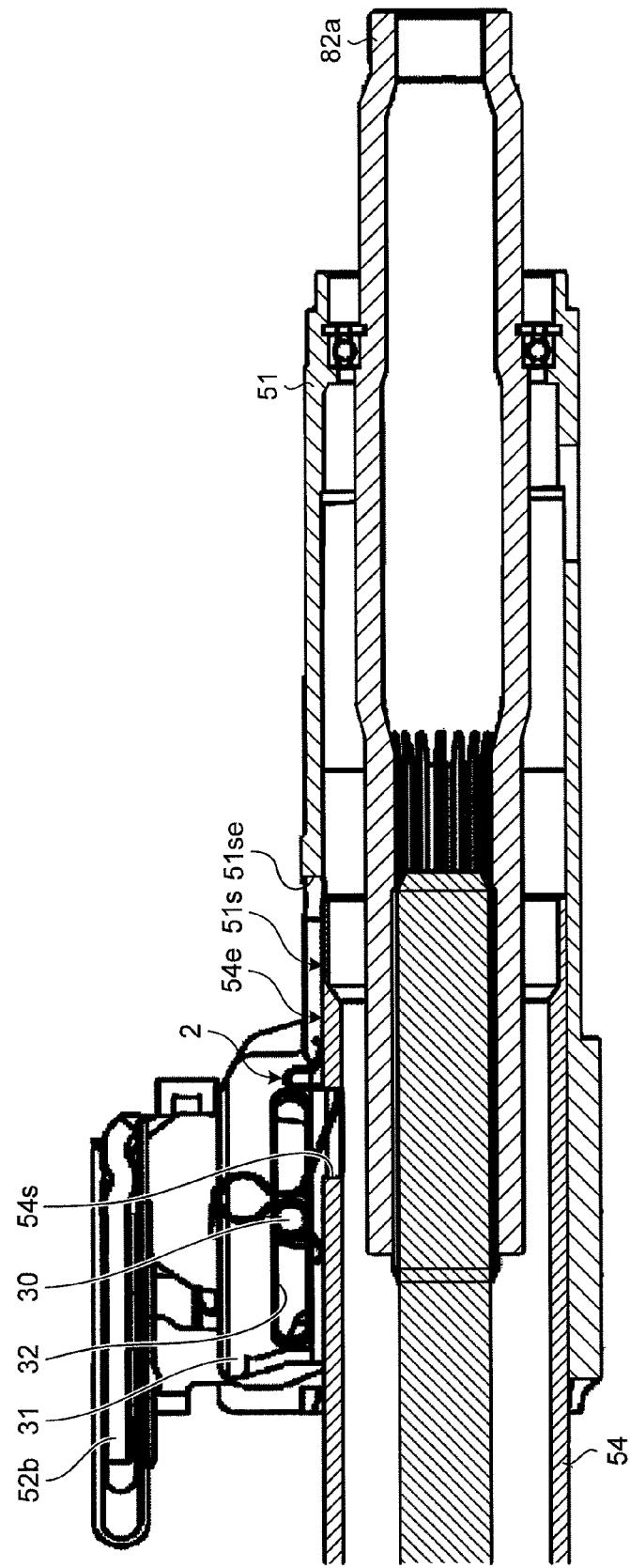
FIG. 6 is a cross-sectional view taken along line B-B' of FIG. 5.

FIG. 5 is a cross-sectional view taken along line A-A' of FIG. 2. FIG. 6 is a cross-sectional view taken along line B-B' of FIG. 5. As illustrated in FIG. 5, the outer column 51 has two telescopic adjustment portions 31. The two telescopic adjustment portions 31 project from an outer peripheral surface of the outer column 51 to extend facing each other. Further, as illustrated in FIG. 6, each of the two telescopic adjustment portions 31 includes an elongated hole 32 elongated in an axial direction of the outer column 51. The elongated holes 32 are penetrated by a columnar rod 30. The rod 30 penetrates the two elongated holes 32 and elongated holes 52ah provided in the side plate portion 52a, and is connected to an operation lever 53. Each of the elongated holes 52ah is an elongated hole being elongated in a direction different from a longitudinal direction of the elongated hole 32, and being elongated in a planar direction perpendicular to an axial direction of the rod 30. Note that the elongated hole 52ah may be not the elongated hole but a circular hole.

Further the outer column 51 includes a slit 51s provided between the two telescopic adjustment portions 31 on the outer peripheral surface. For example, the slit 51s is formed by notching one end on an inserted side of the inner column 54.

An outer diameter of the inner column 54 has a size substantially equal to an inner diameter of the outer column 51. Since the outer column 51 has the slit 51s, when the outer column 51 is tightened, the inner diameter of the outer column 51 decreases. Therefore, while the outer column 51 is tightened, in a portion of the inner column 54 covered by the outer column 51, an inner peripheral surface of the outer column 51 and an outer peripheral surface of the inner column 54 are brought into contact with each other. Therefore, while the outer column 51 is tightened, a frictional force is generated between the outer column 51 and the inner column 54.

In a case where the operation lever 53 is turned, a tightening force to the side plate portion 52a decreases, and the frictional force between the side plate portion 52a and the outer peripheral surface of the outer column 51 is eliminated or reduced. Therefore, a tilt position can be adjusted. Further, since the tightening force to the side plate portion 52a decreases in a case where the operation lever 53 is turned, a width of the slit 51s of the outer column 51 increases. Therefore, the tightening force applied to the inner column 54 by the outer column 51 is eliminated, and the frictional force while the outer column 51 slides is eliminated. Therefore, the operator can turn the operation lever 53 and press the outer column 51 through the steering wheel 81 to adjust a telescopic position. The outer column 51 includes the telescopic adjustment portions 31 each having the elongated hole 32, so that the outer column 51 can be slid with respect to the inner column 54 within a range of the length of the elongated hole 32.

(Urging Member)

In the steering apparatus 80, generally, a gap is generated between the rod 30 and an inner wall of the elongated hole 32 so that the rod 30 can be slid relative to the elongated hole 32 when telescopic adjustment is performed. Presence of the gap eliminates friction between the rod 30 and the inner wall of the elongated hole 32, and thus a force required for telescopic adjustment decreases. However, the presence of the gap might generate play caused by the gap during operation of the steering column 50 performing the telescopic adjustment. Further, since there is room for the rod 30 to tilt in the transverse direction of the elongated hole 32 when telescopic adjustment is performed, the play, amplified according to a distance from the elongated hole 32, might be generated at an end of the operation lever 53.

In the steering apparatus 80, generally, a gap is generated between the rod 30 and an inner wall of the elongated hole 52ah so that the rod 30 can be slid relative to the elongated hole 52ah when tilt adjustment is performed. Presence of the gap eliminates friction between the rod 30 and the inner wall of the elongated hole 52ah, and thus a force required for tilt adjustment decreases. However, the presence of the gap might generate play caused by the gap during operation of the steering column 50 performing the tilt adjustment. Further, since there is room for the rod 30 to tilt in the longitudinal direction of the elongated hole 52ah when tilt adjustment is performed, the play, amplified according to a distance from the elongated hole 52ah, might be generated at the end of the operation lever 53.

In order to inhibit such play, the steering apparatus 80 according to the present embodiment includes an urging member 2 urging the rod 30 outward in a radial direction of the inner column 54. As illustrated in FIG. 6, the urging member 2 is provided at an exposed portion 54e being an outer peripheral surface of the inner column 54 and exposed from the slit 51s. The radial direction signifies a direction perpendicular to the axial direction, and is used for the same meaning in the following description. For example, in the present embodiment, the urging member 2 is positioned at a position having an equal distance from the two telescopic adjustment portions 31.

Figure 7:
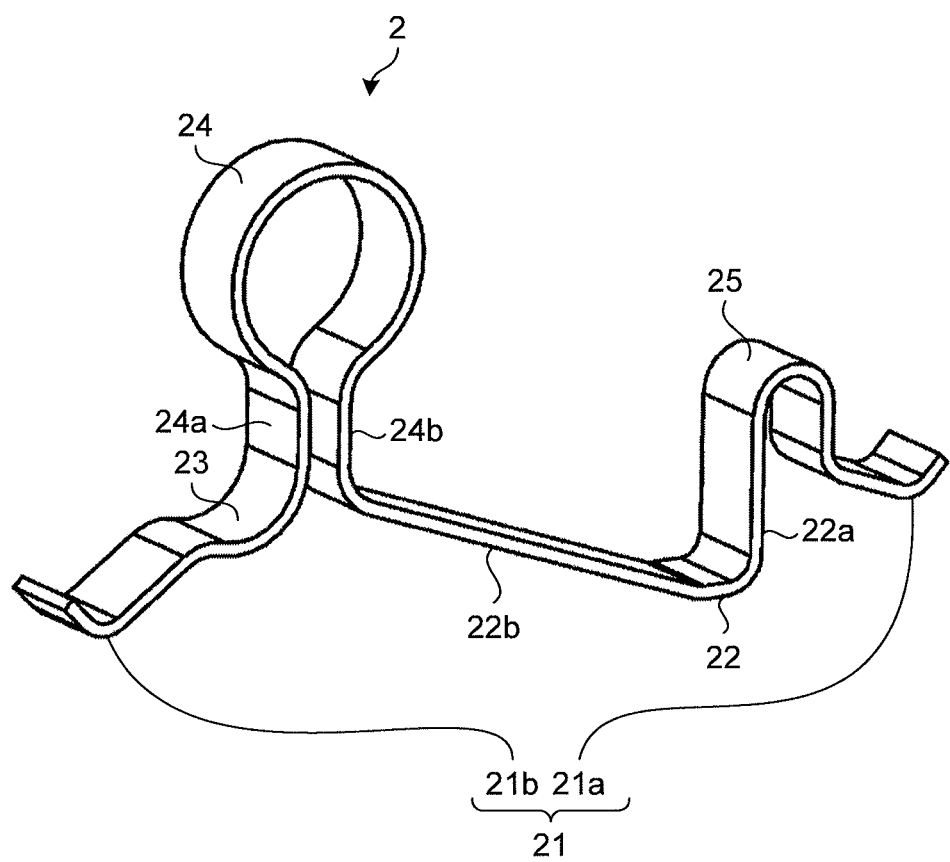
FIG. 7 is a perspective view of an urging member according to the present embodiment.
Figure 8:
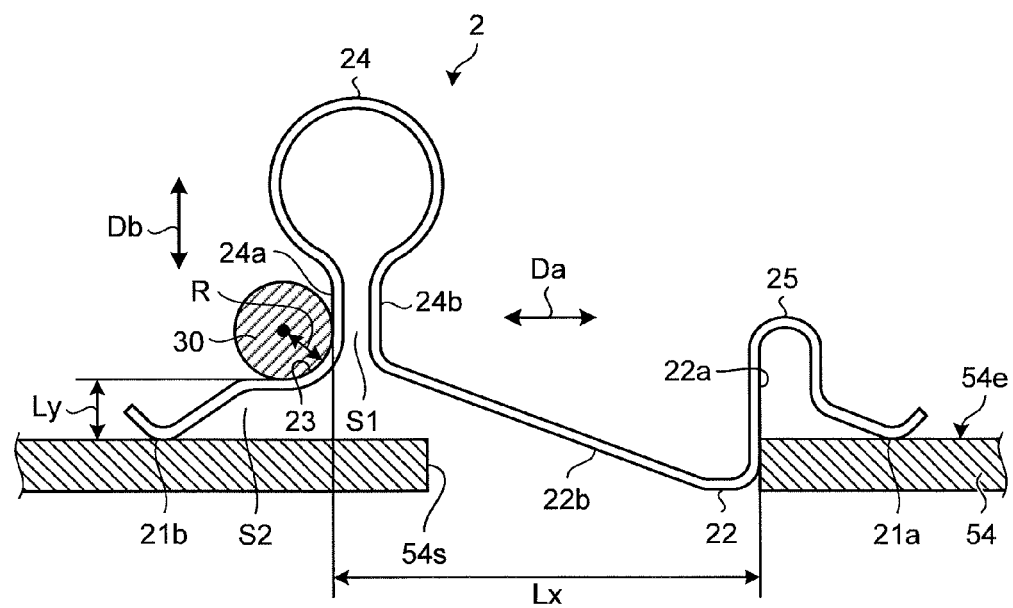
FIG. 8 is a side view of the urging member according to the present embodiment.

FIG. 7 is a perspective view of the urging member according to the present embodiment. FIG. 8 is a side view of the urging member according to the present embodiment. As illustrated in FIG. 7, the urging member 2 includes a spring portion 21, a fitting portion 22 projecting inward in a radial direction of the outer column 51, a contact portion 23 making contact with the rod 30, a ring portion 24 functioning as a spring, and a bent portion 25. The urging member 2 is a so-called leaf spring made of a cold rolled special steel strip for springs, a cold rolled stainless steel strip for springs, or the like. Therefore, the urging member 2 can be manufactured in a lower cost.

A whole width of the urging member 2 is set to a size not inhibiting the change in width of the slit 51s, even if the width of the slit 51s is changed according to the change in tightening force of the side plate portion 52a with respect to the outer column 51.

The spring portion 21 includes a pair of leg portions 21a and 21b. The pair of leg portions 21a and 21b are two leg portions included in the spring portion 21. The pair of leg portions 21a and 21b are set on the exposed portion 54e of the inner column 54, and a whole of the urging member 2 is urged in the radial direction of the outer column 51. Further, the fitting portion 22, a stopper portion 22a, and an inclined surface 22b project inward in the radial direction of the outer column 51, relative to the pair of leg portions 21a and 21b. The fitting portion 22 has the stopper portion 22a disposed on a rear side of the fitting portion 22, and the inclined surface 22b disposed forward of the stopper portion 22a. The stopper portion 22a has, for example, a surface perpendicular to the axial direction of the outer column 51. The inclined surface 22b has an inclined surface having a rear side end and a front side end which are positioned such that the rear side end is interior to the front side end in the radial direction of the outer column 51.

As illustrated in FIG. 6, the inner column 54 includes an opening portion 54s in a part of the exposed portion 54e. The fitting portion 22 of the urging member 2 is fitted into the opening portion 54s. Further, the stopper portion 22a of the fitting portion 22 makes contact with a rear side inner wall of the opening portion 54s. A depth at which the fitting portion 22 is fitted into the opening portion 54s is formed such as a depth where the fitting portion 22 fits into the opening portion 54s, in a free state in which the pair of leg portions 21a and 21b are not bent, while the pair of leg portions 21a and 21b of the urging member 2 are set to the exposed portion 54e being the outer peripheral surface of the inner column 54, and a depth where interference with the steering shaft 82 is prevented. That is, the fitting portion 22 is positioned facing the inner wall of the opening portion 54s while a load is not applied to the pair of leg portions 21a and 21b, and is disposed without making contact with the steering shaft 82. Further, even if the pair of leg portions 21a and 21b of the urging member 2 are bent and an amount of bending is changed, the fitting portion 22 is prevented from getting out of the opening portion 54s, and the fitting portion 22 can be slid relative to the inner column 54.

As illustrated in FIG. 8, the contact portion 23 has an arcuate surface having a radius R and making contact with an outer peripheral surface (shaft surface) of the rod 30. The contact portion 23 makes contact with the outer peripheral surface of the rod 30, in two directions of the axial direction Da and the radial direction Db of the outer column 51. When viewed in the axial direction of the rod 30, an angle between straight lines, that is, a straight line passing from one end of a contact part between the rod 30 and the contact portion 23 to the center of the rod 30, and a straight line passing from the other end of the contact part between the rod 30 and the contact portion 23 to the center of the rod 30, is not less than 90 degrees. That is, the contact portion 23 makes contact with at least one fourth of a circumferential direction of the rod 30. Therefore, the contact portion 23 can urge the rod 30 in the two directions of the axial direction Da and the radial direction Db. Further, a gap S2 is generated between the contact portion 23 and the exposed portion 54e.

The ring portion 24 is formed into a circular shape having a partial opening, and includes a connection portion 24a connected to the ring portion 24 from one opening end, and a connection portion 24b connected to the inclined surface 22b from the other opening end. Since the ring portion 24 is formed into the circular shape having the partial opening, the connection portion 24a and the connection portion 24b are bent into a ring-shaped spring having a variable gap S1, and the rod 30 can be urged in the axial direction Da.

The bent portion 25 connects between the stopper portion 22a and the leg portion 21a, and has a U-shape so that an urging direction is not changed when the leg portion 21a is urged in the radial direction Db. Therefore, the fitting portion 22 is prevented from getting out of the opening portion 54s due to urging of the leg portion 21a.

As illustrated in FIG. 8, the ring portion 24 of the urging member 2 projects outward in the radial direction of the inner column 54, relative to the contact portion 23 and the rod 30. Therefore, the urging member 2 is formed to be readily held to be mounted to the slit 51s of the outer column 51 in a final step of assembling the steering column 50. Consequently, the urging member 2 can be readily mounted to the steering column 50.

As illustrated in FIG. 8, when the urging member 2 is mounted, the urging member 2 is held between a lower side part of the rod 30 and the exposed portion 54e of the inner column 54, and held between a rear side part of the rod 30 and a rear side inner wall of the opening portion 54s of the inner column 54. When the urging member 2 is held between the lower side part of the rod 30 and the exposed portion 54e of the inner column 54, the pair of leg portions 21a and 21b are bent and held in a set length Ly. Thus, the rod 30 is urged outward in the radial direction Db. Further, when the urging member 2 is held between the rear side part of the rod 30 and the rear side inner wall of the opening portion 54s of the inner column 54, the ring portion 24 is bent and held in a set length Lx. Thus, the rod 30 is urged forward in the axial direction Da.

When the rod 30 is urged outward in the radial direction Db, a gap on an upper side of the elongated hole 32 in the radial direction Db decreases between the rod 30 and the inner wall of the elongated hole 32. Therefore, the steering apparatus 80 can prevent play of the rod 30 caused by the gap, and the play amplified according to the distance from the elongated hole 32 can be prevented at the end of the operation lever 53. Further, the steering apparatus 80 can inhibit the play of the steering column 50 caused by the gap between the rod 30 and the inner wall of the elongated hole 32, and smoothly perform telescopic adjustment.

Further, when the rod 30 is urged forward in the axial direction Da, the gap, on a front side in the axial direction Da and between the rod 30 and the inner wall of the elongated hole 52ah, decreases. Therefore, the steering apparatus 80 can prevent the play caused by the gap, and the play amplified according to the distance from the elongated hole 52ah can be prevented at the end of the operation lever 53. Further, the steering apparatus 80 can inhibit the play of the steering column 50 caused by the gap between the rod 30 and the inner wall of the elongated hole 52ah, and smoothly perform tilt adjustment.

Further, the urging member 2 is positioned at the position having the equal distance from the two telescopic adjustment portions 31. Therefore, the urging member 2 presses the rod 30 against the inner walls of the two elongated holes 32 and the inner walls of two elongated holes 52ah, and effectively prevents the play caused by the gap. In other words, the urging member 2 urges the rod 30 at a central position between one elongated hole 32 and the other elongated hole 32 (or a central position between one elongated hole 52ah and the other elongated hole 52ah). Therefore, the urging member 2 can urge these inner walls of the two elongated holes 32 and the inner walls of the two elongated holes 52ah in a balanced manner, with an urging force generated upon urging. Therefore, the steering apparatus 80 can effectively prevent the play amplified according to the distance from the elongated hole 52ah, at the end of the operation lever 53.

As illustrated in FIG. 6, since the fitting portion 22 is fitted into the opening portion 54s and positioned thereto, the urging member 2 might inhibit forward movement of the outer column 51 upon collision of the vehicle. Thus, in the urging member 2 according to the present embodiment, the bent portion 25 and the leg portion 21a are connected to the stopper portion 22a of the fitting portion 22, as described above.

When the secondary collision occurs in which the body of the operator collides with the steering wheel 81 or the like, a forward force is applied to the outer column 51 through the steering wheel 81. Therefore, the outer column 51 is moved forward while absorbing impact by friction with the inner column 54. The outer column 51 is moved forward until the rod 30 makes contact with a rear side end of the elongated hole 32. Since a force applied to the outer column 51 is transmitted to the resin member 12p of the removable capsule 11, the resin member 12p is sheared, and the support of the steering column 50 by the removable capsule 11 is released. Further, the rod 30 is moved forward together with the column bracket 52. Since the urging member 2 is fitted into the opening portion 54s of the inner column 54 and restricted in movement in the axial direction of the outer column 51, when the rod 30 starts to move forward, the urging member 2 is not moved. Therefore, in the outer column 51, a rear side end 51se of the slit 51s, illustrated in FIG. 6, is moved to a position at which the rear side end 51se makes contact with a rear side end of the urging member 2, and makes contact with the urging member 2. Therefore, a force moving the urging member 2 forward is transmitted from the outer column 51.

When the force moving the urging member 2 forward is transmitted from the outer column 51, the rod 30 is moved forward with the outer column 51, and is separated from the contact portion 23 of the urging member 2. Thus, bending of the ring portion 24 is released. The bent portion 25 and the leg portion 21a of the urging member 2 are pressed by the rear side end 51se of the slit 51s, and the urging member 2 is moved while getting the inclined surface 22b over an edge on a front side of the opening portion 54s. Since the bent portion 25 has a large projection outward in the radial direction Db, the bent portion 25 reliably makes contact with the rear side end 51se of the slit 51s. Therefore, the fitting portion 22 can be readily removed from the opening portion 54s. Therefore, the urging member 2 is unlikely to inhibit forward movement of the outer column 51. Thus, the steering apparatus 80 can normally urge the rod 30 with the urging member 2, and can smoothly move the outer column 51 forward when the secondary collision occurs.

As described above, the steering apparatus 80 according to the present embodiment has the cylindrical outer column 51, and the cylindrical inner column 54 partially inserted into the outer column 51, and the steering apparatus 80 includes the steering column 50 rotatably supporting the input shaft 82a connected to the steering wheel 81. The steering apparatus 80 includes the two telescopic adjustment portions 31 and the rod 30. The two telescopic adjustment portions 31 project from the outer peripheral surface of the outer column 51 to extend facing each other, and each includes the elongated hole 32 elongated in the axial direction of the outer column 51, and the rod 30 penetrates the elongated hole 32. Further, the steering apparatus 80 includes the urging member 2 provided on the outer peripheral surface of the inner column 54 exposed from the slit 51s provided between the two telescopic adjustment portions 31 on the outer peripheral surface of the outer column 51, and urging the rod 30 outward in the radial direction of the inner column 54.

Therefore, the rod 30 is moved outward in the radial direction of the inner column 54 compared with the rod being not urged. Therefore, the rod 30 is positioned on one side of the elongated hole 32 in the transverse direction, and the rod 30 readily holds a condition where the rod 30 makes contact with the inner wall of the elongated hole 32. Thus, the steering apparatus 80 can inhibit play of the steering column 50 caused by the gap between the rod 30 and the inner wall of the elongated hole 32, and smoothly perform telescopic adjustment.

Further, in the steering apparatus 80 according to the present embodiment, the inner column 54 includes, in the outer peripheral surface, the opening portion 54s. The urging member 2 includes the spring portion 21, the fitting portion 22, and the contact portion 23. The fitting portion 22 projects relative to the spring portion 21 to extend inward in the radial direction of the outer column 51, and is fitted into the opening portion 54s. The contact portion 23 projects from the spring portion 21 in the axial direction of the outer column 51 and making contact with the rod 30. In the urging member 2, the two leg portions 21a and 21b of the spring portion 21 of the urging member 2 urges the rod 30 outward in the radial direction Db. Therefore, while the urging member 2 is positioned by the fitting portion 22, the rod 30 can be urged outward in the radial direction Db by the contact portion 23. The position of the urging member 2 is fixed in normal use, and the rod 30 can be further stably urged.

Further, in the steering apparatus 80 according to the present embodiment, the inner column 54 includes, in the outer peripheral surface, the opening portion 54s. The urging member 2 includes the spring portion 21, the fitting portion 22, the contact portion 23, and the ring portion 24. The fitting portion 22 projects relative to the spring portion 21 to extend inward in the radial direction of the outer column 51, and is fitted into the opening portion 54s. The contact portion 23 projects from the spring portion 21 in the axial direction of the outer column 51 and making contact with the rod 30. The fitting portion 22 is provided with the stopper portion 22a making contact with the rear side inner wall of the opening portion 54s of the inner column 54, and the ring portion 24 urges the rod 30 forward in the axial direction Da. Therefore, while the urging member is positioned by the fitting portion, the rod can be urged forward in the axial direction by the contact portion. The position of the urging member is fixed in normal use, and the rod can be further stably urged.

Further, in the steering apparatus 80 according to the present embodiment, the urging member 2 is positioned at the position having the equal distance from the two telescopic adjustment portions 31. In a case where the urging member 2 is disposed biased toward one of the two telescopic adjustment portions 31, a portion of the rod 30 penetrating a farther one of the elongated holes 32 from the urging member 2 is unlikely to be restricted in movement in the transverse direction of the elongated hole 32. Therefore, the rod 30 might be tilted in the transverse direction of the elongated hole 32, with a closer one of the elongated holes 32 to the urging member 2 as a fulcrum. Therefore, play amplified according to a distance from the closer one of the elongated holes 32 to the urging member 2 might be generated at the end of the operation lever 53. In contrast, in the steering apparatus 80, the urging member 2 urges the rod 30 at the central position between the one of the elongated holes 32 and the other one of the elongated holes 32 (i.e., a central position between one of the elongated holes 52ah and other one of the elongated holes 52ah). Therefore, the urging member 2 can urge these inner walls of the two elongated holes 32 and the inner walls of the two elongated holes 52ah in a balanced manner, with an urging force generated upon urging. Thus, the steering apparatus 80 can perform more smooth telescopic adjustment, and great play may be restricted at the end of the operation lever 53.

(Modification)

Figure 9:
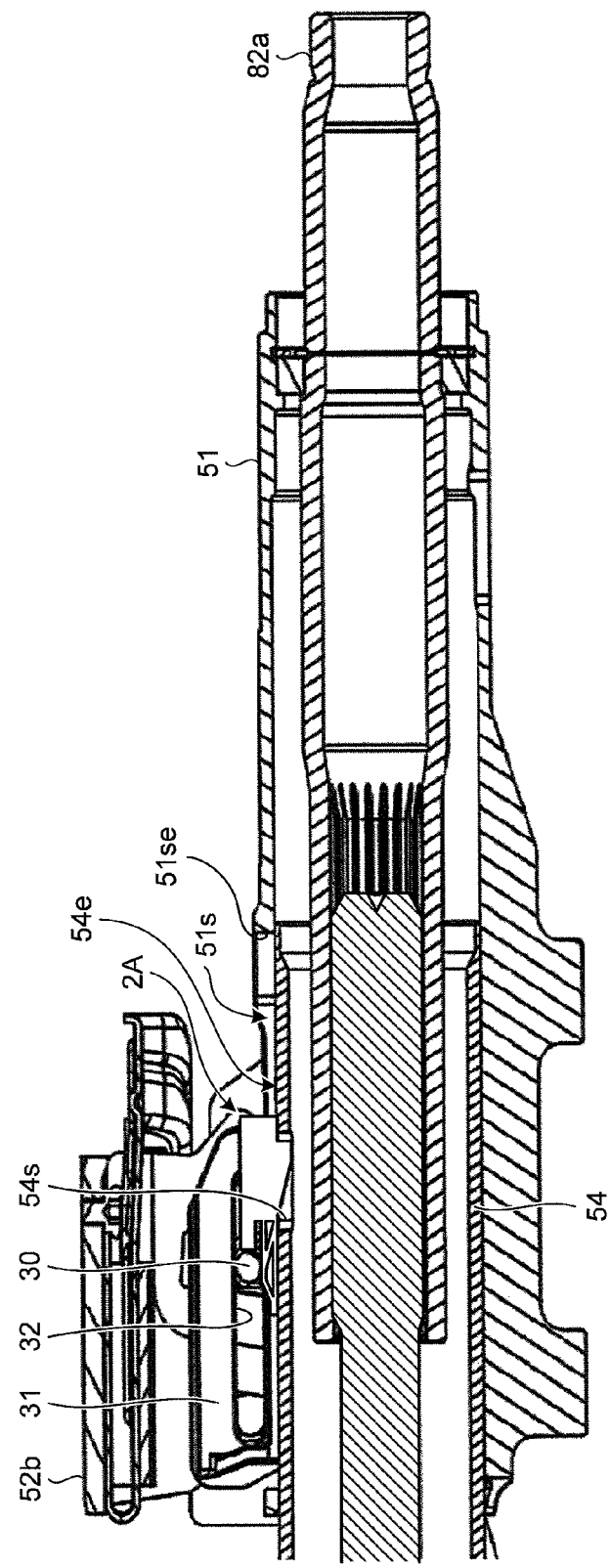
FIG. 9 is a cross-sectional view corresponding to a cross-sectional view taken along line B-B' of FIG. 5 in a steering apparatus according to a modification.
Figure 10:
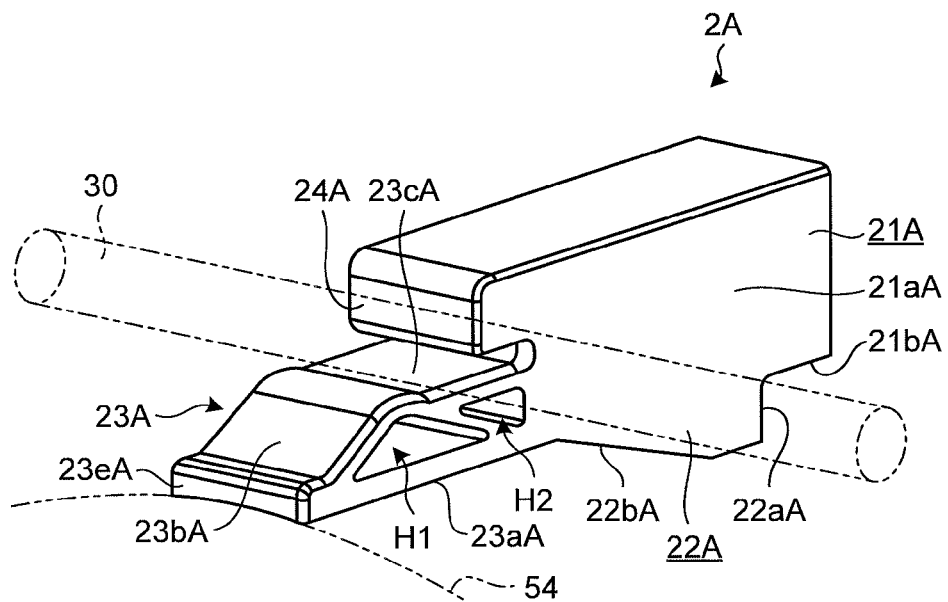
FIG. 10 is a perspective view of an urging member according to a modification, as viewed from one side.
Figure 11:
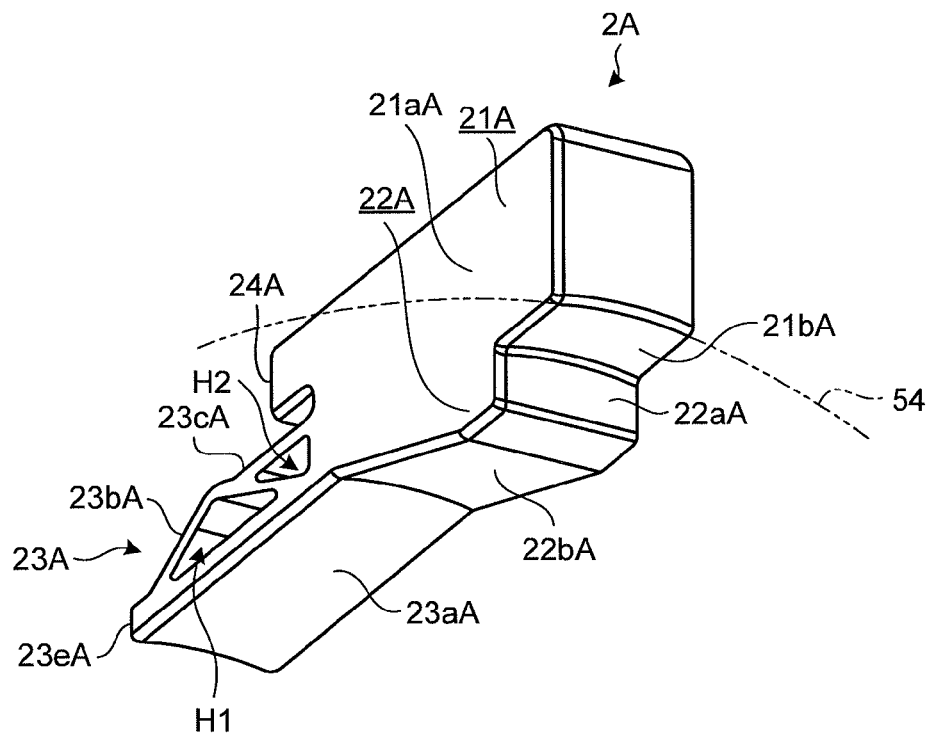
FIG. 11 is a perspective view of the urging member according to a modification, as viewed from the other side.

FIG. 9 is a cross-sectional view corresponding to a cross-sectional view taken along line B-B' of FIG. 5 in the steering apparatus according to a modification. FIG. 10 is a perspective view of an urging member according to a modification, as viewed from one side. FIG. 11 is a perspective view of the urging member according to a modification, as viewed from the other side. As illustrated in FIG. 10, an urging member 2A includes a base portion 21A, a fitting portion 22A, a deformable portion 23A, and a stopper portion 24A. The fitting portion 22A projects from the base portion 21A to extend inward in the radial direction of the outer column 51, the deformable portion 23A projects from the base portion 21A to extend in the axial direction of the outer column 51 and is elastically deformable, and the stopper portion 24A is located at a position different from the deformable portion 23A, projects from the base portion 21A, to extend in the axial direction of the outer column 51. The urging member 2A preferably includes a synthetic resin having a high oil resistance, such as a polyacetal. Therefore, friction decreases at a portion at which the rod 30 makes contact with the urging member 2A. Note that the urging member 2A may include a synthetic rubber, such as an elastomer or a nitrile rubber.

The base portion 21A has, for example, a substantially rectangular parallelepiped shape, and includes two side surfaces 21aA facing inner walls of the slit 51s. A predetermined gap is provided between a side surface 21aA and an inner wall of the slit 51s. Further, the fitting portion 22A, the deformable portion 23A, and the stopper portion 24A have a width equal to that of the base portion 21A in a circumferential direction of the outer column 51. Therefore, even if the width of the slit 51s is changed according to the change in tightening force of the side plate portion 52a with respect to the outer column 51, the urging member 2A does not inhibit the change in width of the slit 51s. Further, the base portion 21A has a bottom surface 21bA facing the outer peripheral surface of the inner column 54, and the bottom surface 21bA has a curved surface following the shape of the outer peripheral surface of the inner column 54.

The fitting portion 22A projects from the bottom surface 21bA of the base portion 21A to extend inward in the radial direction of the outer column 51. The fitting portion 22A has a fixed surface 22aA disposed on a rear side of the fitting portion 22A, and an inclined surface 22bA disposed forward of the fixed surface 22aA. The fixed surface 22aA has, for example, a surface perpendicular to the axial direction of the outer column 51. The inclined surface 22bA has a surface inclined so that a rear side end is positioned inward of a front side end in the radial direction of the outer column 51.

As illustrated in FIG. 9, the inner column 54 includes the opening portion 54s in a part of the exposed portion 54e. The fitting portion 22A of the urging member 2A is fitted into the opening portion 54s. Further, the fixed surface 22aA of the fitting portion 22A makes contact with the rear side inner wall of the opening portion 54s.

As illustrated in FIG. 10, the deformable portion 23A includes a bottom surface 23aA, an end surface 23eA, an inclined surface 23bA, and a contact surface 23cA. The bottom surface 23aA has a surface facing the outer peripheral surface of the inner column 54, and is provided to extend forward of the front side end of the inclined surface 22bA. The bottom surface 23aA has a curved surface following the shape of the outer peripheral surface of the inner column 54. The end surface 23eA is positioned at a front side end of the bottom surface 23aA, and has a surface perpendicular to the axial direction of the outer column 51. The inclined surface 23bA has a surface inclined so that a rear side end is positioned outward of a front side end in the radial direction of the outer column 51, and the inclined surface 23bA is provided to extend rearward of the end surface 23eA. Further, the inclined surface 23bA has a curved surface having a parabolic shape when viewed in the axial direction of the rod 30. The contact surface 23cA has a surface perpendicular to the radial direction of the outer column 51, and is provided to extend rearward of the rear side end of the inclined surface 23bA.

As illustrated in FIGS. 10 and 11, the deformable portion 23A includes through-holes H1 and H2. The through-holes H1 and H2 have, for example, a substantially triangular shape when viewed in the axial direction of the rod 30. The through-hole H1 is disposed forward of the through-hole H2, and is partially disposed between the bottom surface 23aA and the inclined surface 23bA. The through-hole H2 is disposed between the bottom surface 23aA and the contact surface 23cA. When an external force is applied, the through-holes H1 and H2 are deformed. Therefore, the deformable portion 23A can be elastically deformed. Note that the through-holes H1 and H2 may have, for example, a circular shape when viewed in the axial direction of the rod 30, different from the substantially triangular shape. Further, any one of the through-holes H1 and H2 may be provided, or none of the through-holes H1 and H2 may be provided.

As illustrated in FIGS. 10 and 11, the stopper portion 24A projects from the base portion 21A, at a position outward of the deformable portion 23A in the radial direction of the inner column 54. A front side end surface of the stopper portion 24A makes contact with the rear side part of the rod 30. Since the fixed surface 22aA of the fitting portion 22A makes contact with the rear side inner wall of the opening portion 54s, and the stopper portion 24A makes contact with the rod 30, the urging member 2A is restricted in movement in the axial direction of the outer column 51.

The urging member 2A is mounted to the steering apparatus 80, for example, by inserting, from a rear side, the end surface 23eA between the rod 30 and the inner column 54. After the end surface 23eA is inserted, the inclined surface 23bA makes contact with the rod 30. When the inclined surface 23bA makes contact with the rod 30, the inclined surface 23bA is pressed inward by the rod 30 in the radial direction of the outer column 51, and elastically deformed. The urging member 2A includes the through-hole H1 to facilitate elastic deformation of the inclined surface 23bA. Therefore, the urging member 2A is readily mounted to the steering apparatus 80, compared with an urging member without the through-hole H1.

Further, in the urging member 2A, a position of the base portion 21A is different from the position of the deformable portion 23A in the axial direction of the outer column 51 (rearward of the deformable portion 23A). Therefore, when the urging member 2A is mounted to the steering apparatus 80, the deformable portion 23A can be inserted between the rod 30 and the inner column 54, by grasping the base portion 21A. Thus, the urging member 2A can be further readily mounted to the steering apparatus 80.

As illustrated in FIG. 10, the rod 30 makes contact with the contact surface 23cA. Further, when the urging member 2A is not mounted to the steering apparatus 80, a thickness from the bottom surface 23aA to the contact surface 23cA is larger than a distance from the outer peripheral surface of the inner column 54 to the outer peripheral surface of the rod 30. Therefore, when the urging member 2A is mounted to the steering apparatus 80, the deformable portion 23A is held between the rod 30 and the inner column 54 and elastically deformed. Thus, the deformable portion 23A urges the rod 30 outward in the radial direction of the inner column 54.

Further, the rear side end of the inclined surface 23bA makes contact with the rod 30. Therefore, while being held by the inclined surface 23bA and the stopper portion 24A from both sides in the axial direction of the outer column 51, the rod 30 is urged outward in the radial direction of the inner column 54. Therefore, the rod 30 is further stably urged outward in the radial direction of the inner column 54.

The rod 30 is urged outward in the radial direction of the inner column 54 by the urging member 2A, and thus, the rod 30 is moved outward in the radial direction of the inner column 54 compared with the rod being not urged. Therefore, the rod 30 is biased toward one side of the elongated hole 32 in the transverse direction, and the rod 30 is readily held in a state making contact with the inner wall of the elongated hole 32. Thus, the steering apparatus 80 can inhibit play of the steering column 50 caused by the gap between the rod 30 and the inner wall of the elongated hole 32, and smoothly perform telescopic adjustment.

Further, the urging member 2A, including the fitting portion 22A fitted into the opening portion 54s, and the deformable portion 23A held between the rod 30 and the inner column 54 and elastically deformed, can urge the rod 30 with the deformable portion 23A, while the urging member 2A is positioned by the fitting portion 22A. Thus, since the position of the urging member 2A is fixed in normal use, the urging member 2A can urge the rod 30 further stably.

Further, the urging member 2A is positioned at the position having the equal distance from the two telescopic adjustment portions 31, as described above. In a case where the urging member 2A is disposed biased toward one of the two telescopic adjustment portions 31, a portion of the rod 30 penetrating a farther one of the elongated holes 32 from the urging member 2A is unlikely to be restricted in movement in the transverse direction of the elongated hole 32. Therefore, the rod 30 might be tilted in the transverse direction of the elongated hole 32, with a closer one of the elongated holes 32 to the urging member 2A as a fulcrum. Therefore, play amplified according to a distance from the closer one of the elongated holes 32 to the urging member 2A might be generated at the end of the operation lever 53. In contrast, in a modification, the urging member 2A is positioned at the position having the equal distance from the two telescopic adjustment portions 31, and thus the rod 30 is unlikely to be tilted in the transverse direction of the elongated hole 32, with one of the elongated holes 32 as a fulcrum. Thus, the steering apparatus 80 can perform more smooth telescopic adjustment, and great play may be restricted at the end of the operation lever 53.

Note that, in the urging member 2A, the shape of the through-holes H1 and H2 can be changed to adjust deformability of the contact surface 23cA. Therefore, the urging member 2A can adjust a force of the contact surface 23cA required to urge the rod 30. Thus, the steering apparatus 80 can inhibit an excessive urging force on the rod 30.

Further, the steering apparatus 80 may include a spacer between the rod 30 and the inner wall of the elongated hole 32 to inhibit friction between the rod 30 and the inner wall of the elongated hole 32 which is a metal portion. The spacer preferably includes a synthetic resin having a high oil resistance, such as a polyacetal. When the elongated hole 32 includes the spacer, the steering apparatus 80 can perform the telescopic adjustment while the rod 30 is urged to the spacer. Thus, the steering apparatus 80 including the spacer can reduce the possibility of generating metal scratching sound, compared with direct contact between the rod 30 and the inner wall of the elongated hole 32.

As illustrated in FIG. 9, since the fitting portion 22A is fitted into the opening portion 54s and positioned thereto, the urging member 2A might inhibit forward movement of the outer column 51 upon collision of the vehicle. Therefore, as described above, the urging member 2A according to a modification includes the inclined surface 22bA in the fitting portion 22A.

When the secondary collision occurs in which the body of the operator collides with the steering wheel 81 or the like, a forward force is applied to the outer column 51 through the steering wheel 81. Therefore, the outer column 51 is moved forward while absorbing impact by friction with the inner column 54. The outer column 51 is moved forward until the rod 30 makes contact with a rear side end of the elongated hole 32. Since the force applied to the outer column 51 is transmitted to the resin member 12p, the resin member 12p is sheared, and the support of the steering column 50 by the removable capsule 11 is released. Then, the rod 30 is moved forward together with the column bracket 52. Since the urging member 2A is fitted into the opening portion 54s and restricted in movement in the axial direction of the outer column 51, when the rod 30 starts to move forward, the urging member 2A does not start moving. Then, the outer column 51 is moved to a position at which the rear side end 51se of the slit 51s illustrated in FIG. 9 makes contact with a rear side end of the urging member 2A. Therefore, a force moving the urging member 2A forward is transmitted from the outer column 51.

When the force moving the urging member 2A forward is transmitted from the outer column 51, the urging member 2A is moved while getting the inclined surface 22bA over an edge on a front side of the opening portion 54s. Therefore, the fitting portion 22A can be readily removed from the opening portion 54s. Therefore, the urging member 2A is unlikely to inhibit forward movement of the outer column 51. Thus, the steering apparatus 80 can normally urge the rod 30 with the urging member 2A, and can smoothly move the outer column 51 forward when the secondary collision occurs.

As described above, in the steering apparatus 80 according to a modification, the inner column 54 includes, in the outer peripheral surface, the opening portion 54s. Further, the urging member 2A includes the base portion 21A, the fitting portion 22A, and the deformable portion 23A. The fitting portion 22A projects from the base portion 21A to extend inward in the radial direction of the outer column 51, and is fitted into the opening portion 54s, and the deformable portion 23A projects from the base portion 21A to extend in the axial direction of the outer column 51, and is held between the rod 30 and the inner column 54 and elastically deformed. Therefore, the urging member 2A can urge the rod 30 with the deformable portion 23A, while the urging member 2A is positioned by the fitting portion 22A. The position of the urging member 2A is fixed in normal use, and the rod 30 can be further stably urged.

REFERENCE SIGNS LIST

11 REMOVABLE CAPSULE
11h CAPSULE MOUNTING HOLE
12p RESIN MEMBER
2, 2A URGING MEMBER
21 SPRING PORTION
21a LEG PORTION
21b LEG PORTION
21A BASE PORTION
21aA SIDE SURFACE
21bA BOTTOM SURFACE
22 FITTING PORTION
22a STOPPER PORTION
22b INCLINED SURFACE
22A FITTING PORTION
22aA FIXED SURFACE
22bA INCLINED SURFACE
23 CONTACT PORTION
23A DEFORMABLE PORTION
23aA BOTTOM SURFACE
23bA INCLINED SURFACE
23cA CONTACT SURFACE
23eA END SURFACE
24 RING PORTION
24a CONNECTION PORTION
24b CONNECTION PORTION
24A STOPPER PORTION
25 BENT PORTION
30 ROD
31 TELESCOPIC ADJUSTMENT PORTION
32 ELONGATED HOLE
50 STEERING COLUMN
51 OUTER COLUMN
51s SLIT
51se REAR SIDE END
52 COLUMN BRACKET
52a SIDE PLATE PORTION
52ah ELONGATED HOLE
52b MOUNTING PLATE PORTION
53 OPERATION LEVER
54 INNER COLUMN
54e EXPOSED PORTION
54s OPENING PORTION
59 CAPSULE SUPPORTING PORTION
70 ELECTRIC MOTOR
80 STEERING APPARATUS
81 STEERING WHEEL
82 STEERING SHAFT
82a INPUT SHAFT
82b OUTPUT SHAFT
83 STEERING FORCE ASSIST MECHANISM
84 UNIVERSAL JOINT
85 LOWER SHAFT
86 UNIVERSAL JOINT
87 PINION SHAFT
88 STEERING GEAR
88a PINION
88b RACK
89 TIE ROD
90 ECU
91a TORQUE SENSOR
91b VEHICLE SPEED SENSOR
92 REDUCTION GEAR
98 IGNITION SWITCH
99 POWER UNIT
H1, H2 THROUGH-HOLE
S1, S2 GAP

The invention claimed is:
1. A steering apparatus comprising:
a steering column including a cylindrical outer column and a cylindrical inner column partially inserted into the outer column, and rotatably supporting an input shaft connected to a steering wheel;
two telescopic adjustment portions projecting from an outer peripheral surface of the outer column to extend facing each other, the two telescopic adjustment portions each including an elongated hole elongated in an axial direction of the outer column;
a rod penetrating the elongated hole; and
an urging member provided on an outer peripheral surface of the inner column exposed from a slit provided between the two telescopic adjustment portions on the outer peripheral surface of the outer column, and urging the rod outward in a radial direction of the inner column, the urging member being positioned in an opening portion provided in an outer peripheral surface of the inner column.

2. The steering apparatus according to claim 1, wherein the urging member includes a spring portion, a fitting portion projecting relative to the spring portion to extend inward in a radial direction of the outer column, and is fitted into the opening portion, and a contact portion projecting from the spring portion to extend in the axial direction of the outer column and making contact with the rod, and the spring portion of the urging member has two leg portions, the two leg portions urge the rod outward in the radial direction of the outer column.

3. The steering apparatus according to claim 1, wherein the urging member includes a spring portion, a fitting portion projecting relative to the spring portion to extend inward in a radial direction of the outer column, and is fitted into the opening portion, a contact portion projecting from the spring portion to extend in the axial direction of the outer column and making contact with the rod, and a ring portion, the fitting portion is provided with a stopper portion making contact with a rear side inner wall of the opening portion of the inner column, and the ring portion urges the rod forward in the axial direction of the outer column.

4. The steering apparatus according to claim 1, wherein the urging member includes a base portion, a fitting portion projecting from the base portion to extend inward in the radial direction of the outer column, and fitted into the opening portion, and a deformable portion projecting from the base portion to extend in the axial direction of the outer column, held between the rod and the inner column, and elastically deformed.

5. The steering apparatus according to claim 1, wherein the urging member is positioned at an equal distance from the two telescopic adjustment portions.

* * * * *